US009998269B2

(12) United States Patent
Park et al.

(10) Patent No.: US 9,998,269 B2
(45) Date of Patent: Jun. 12, 2018

(54) METHOD FOR TRANSMITTING AND RECEIVING DOWNLINK CONTROL CHANNEL, AND APPARATUS THEREFOR

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 125 days.

(21) Appl. No.: 15/026,260

(22) PCT Filed: Sep. 26, 2014

(86) PCT No.: PCT/KR2014/008995
§ 371 (c)(1),
(2) Date: Mar. 31, 2016

(87) PCT Pub. No.: WO2015/050339
PCT Pub. Date: Apr. 9, 2015

(65) Prior Publication Data
US 2016/0249331 A1  Aug. 25, 2016

(30) Foreign Application Priority Data

Oct. 4, 2013  (KR) .................. 10-2013-0118593
Nov. 21, 2013  (KR) .................. 10-2013-0142479
Jun. 2, 2014  (KR) .................. 10-2014-0067128

(51) Int. Cl.
*H04W 4/00* (2018.01)
*H04L 5/00* (2006.01)
*H04L 1/18* (2006.01)

(52) U.S. Cl.
CPC .......... *H04L 5/0053* (2013.01); *H04L 1/1819* (2013.01)

(58) Field of Classification Search
CPC ..................... H04W 74/04; H04L 5/0058
(Continued)

(56) References Cited

U.S. PATENT DOCUMENTS

2014/0293975 A1  10/2014  Kim et al.
2015/0092757 A1*  4/2015  Tiirola .................. H04L 5/0055
370/336

(Continued)

FOREIGN PATENT DOCUMENTS

| CN | 101425880 A | 5/2009 |
| CN | 102255688 A | 11/2011 |

(Continued)

OTHER PUBLICATIONS

Catt, "Analysis of coverage improvement for low-cost MTC LTE UEs", R1-125247, 3GPP TSG RAN WG1 Meeting #71, New Orleans, USA, Nov. 12-16, 2012.

(Continued)

*Primary Examiner* — Iqbal Zaidi
(74) *Attorney, Agent, or Firm* — IP Legal Services, LLC

(57) ABSTRACT

Provided are a method for transmitting and receiving a downlink control channel and to an apparatus therefor. The method of a base station may include determining a starting subframe of a plurality of downlink subframes for repeatedly transmitting a downlink control channel; determining a search space including at least one of a control channel element (CCE) indexes or an enhanced CCE (ECCE) indexes constituting a physical downlink control channel (PDCCH) candidate or an enhanced physical downlink control channel (EPDCCH) candidate which are repeatedly transmitted through the plurality of downlink subframes; and repeatedly transmitting the downlink control channel through the plurality of downlink subframes, on the basis of the determined starting subframe and the CCE index(es) or ECCE index(es).

9 Claims, 15 Drawing Sheets

(58) Field of Classification Search
USPC .................................................. 370/241–339
See application file for complete search history.

(56) References Cited

U.S. PATENT DOCUMENTS

| | | | | |
|---|---|---|---|---|
| 2015/0173063 A1* | 6/2015 | Oizumi | ................ | H04L 1/1861 370/242 |
| 2015/0245340 A1* | 8/2015 | Cheng | .................. | H04W 48/12 370/331 |

FOREIGN PATENT DOCUMENTS

| | | |
|---|---|---|
| CN | 103096478 A | 5/2013 |
| WO | 2013/019088 A2 | 2/2013 |
| WO | 2013/062374 A1 | 5/2013 |

OTHER PUBLICATIONS

Huawei et al., "Discussion on PUCCH and (e)PDCCH for coverage limited MTC UEs", R1-132884, 3GPP TSG RAN WG1 Meeting #74, Barcelona, Spain, Aug. 19-23, 2013.
Samsung, "Coverage Enhancements for MTC UEs", R1-133100, 3GPP TSG RAN WG1 #74, Barcelona, Spain, Aug. 19-23, 2013.
Mediatek Inc., "Analysis of (E)PDCCH enhancements and timing relationship with PDSCH", R1-134444, 3GPP TSG RAN WG1 #74b, Guangzhou, P.R. China, Oct. 7-11, 2013.
Mediatek Inc., "Coverage Analysis of PDSCH and Enhancement Techniques for MTC UEs", R1-130220, 3GPP TSG RAN WG1 Meeting #72, St Julian's, Malta, Jan. 28-Feb. 1, 2013.
Zte, "Discussion on Repetition for Control and Traffic Channel", R1-133062, 3GPP TSG RAN WG1 Meeting #74, Barcelona, Spain, Aug. 19-23, 2013.

* cited by examiner

FIG.3

| PDCCH FORMAT | NUMBER OF CCEs | NUMBER OF RESOURCE-ELEMENT GROUPS | NUMBER OF PDCCH BITS |
|---|---|---|---|
| 0 | 1 | 9 | 72 |
| 1 | 2 | 18 | 144 |
| 2 | 4 | 36 | 288 |
| 3 | 8 | 72 | 576 |

FIG.4

| NORMAL CYCLIC PREFIX | | EXTENDED CYCLIC PREFIX | |
|---|---|---|---|
| SPECIAL SUBFRAME, CONFIGURATION 3, 4, 8 | SPECIAL SUBFRAME, CONFIGURATION 1, 2, 6, 7, 9 | NORMAL SUBFRAME | SPECIAL SUBFRAME, CONFIGURATION 1, 2, 3, 5, 6 |
| NORMAL SUBFRAME | | | |
| 4 | | 8 | |

FIG.5

| EPDCCH FORMAT | NUMBER OF ECCES FOR ONE EPDCCH, $N_{ECCE}^{EPDCCH}$ | | | |
|---|---|---|---|---|
| | CASE A | | CASE B | |
| | LOCALIZED TRANSMISSION | DISTRIBUTED TRANSMISSION | LOCALIZED TRANSMISSION | DISTRIBUTED TRANSMISSION |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | - | 32 | - | 16 |

METHOD FOR TRANSMITTING AND RECEIVING DOWNLINK CONTROL CHANNEL, AND APPARATUS THEREFOR

CROSS REFERENCE TO RELATED APPLICATIONS

This application is a National Stage Patent Application of PCT International Patent Application No. PCT/KR2014/008995 (filed on Sep. 26, 2014) under 35 U.S.C. § 371, which claims priority to Korean Patent Application Nos. 10-2013-0118593 (filed on Oct. 4, 2013), 10-2013-0142479 (filed on Nov. 21, 2013) and 10-2014-0067128 (filed on Jun. 2, 2014), the teachings of which are incorporated herein in their entireties by reference.

TECHNICAL FIELD

The present disclosure relates to a method for transmitting and receiving a downlink control channel and an apparatus therefore and, more particularly, to a method and an apparatus for transmitting a downlink control channel for a Machine Type Communication (MTC) User equipment (UE).

BACKGROUND ART

Machine Type communication (MTC) or Machine to Machine (M2M) refers to communication between a device and an object with no or minimum human intervention. As used herein, a "machine" may refer to an entity that requires no direct human manipulation or intervention, and "MTC" may refer to a type of data communication including one or more of such "machines". Examples of the "machines" may include a smart meter, which is equipped with a mobile communication module, a vending machine, and the like; and, since the advent of smartphones that automatically access networks and perform communication, without the user's manipulation or intervention, according to the user's position or situation, portable user equipment (UE) having MTC functions are also considered to be a type of "machines".

MTC UEs may be generally installed in places with poor propagation environments compared with normal UEs. Therefore, MTC UEs need to have a coverage improved at least by about 20 dB compared with normal UEs.

In order for a MTC UE to operate in a coverage, which is improved at least by about 20 dB compared with a normal UE, control information regarding each physical channel, which is only transmitted with regard to a single subframe, and/or data need to be transmitted repeatedly via a plurality of subframes. However, there is a need, during such repeated transmission, for a method for providing information regarding a subframe, which is to be transmitted repeatedly to the MTC UE, and a search space.

DETAILED DESCRIPTION OF THE INVENTION

Technical Problem

Therefore, embodiments of the present disclosure have been made in view of the above-mentioned problems, and an aspect of the present disclosure is to provide a method and an apparatus for transmitting and receiving a downlink control channel for a MTC UE. Particularly, a scheme for setting a search space for a PDCCH (Physical Downlink Control CHannel) or an EPDCCH (Enhanced Physical Downlink Control Channel) of a MTC UE is presented.

Technical Solution

In accordance with an embodiment, a method may be provided for transmitting a downlink control channel by a base station. The method may include determining a starting subframe of a plurality of downlink subframes for repeatedly transmitting the downlink control channel; determining a search space comprising at least one of CCE (Control Channel Element) index(es) and ECCE (Enhanced CCE) index(es) that constitute a PDCCH (Physical Downlink Control CHannel) candidate or an EPDCCH (Enhanced Physical Downlink Control CHannel) candidate, which is repeatedly transmitted via the plurality of downlink subframes; and transmitting the downlink control channel repeatedly via the plurality of downlink subframes on the basis of the determined starting subframe and CCE index(es) or ECCE index(es).

In accordance with another embodiment, a method may be provided for receiving a downlink control channel by a user equipment (UE). The method may include confirming a starting subframe of a plurality of downlink subframes for repeatedly transmitting the downlink control channel; confirming CCE index(es) or ECCE index(es) assigned to a search space for a PDCCH candidate or an EPDCCH candidate in the plurality of downlink subframes; and performing monitoring via the plurality of downlink subframes and receiving the downlink control channel repeatedly based on the confirmed starting subframe and CCE index(es) or ECCE index(es).

In accordance with still another embodiment, a base station may be provided for transmitting a downlink control channel. The base station includes: a control unit and a transmission unit. The control unit is configured to determine a starting subframe of a plurality of downlink subframes for repeatedly transmitting the downlink control channel and determine a search space comprising CCE index(es) or ECCE index(es) that constitute a PDCCH or EPDCCH candidate, which is repeatedly transmitted via the plurality of downlink subframes. The transmission unit is configured to transmit the downlink control channel repeatedly via the plurality of downlink subframes based on the determined starting frame and CCE index(es) or ECCE index(es).

In accordance with yet another embodiment, a user equipment may be provided for receiving a downlink control channel. The user equipment includes a control unit and a reception unit. The control unit is configured to confirm a starting subframe of a plurality of downlink subframes for repeatedly transmitting the downlink control channel and confirm CCE index(es) or ECCE index(es) assigned to a search space for a PDCCH or EPDCCH candidate in the plurality of downlink subframes. The reception unit is configured to perform monitoring via the plurality of downlink subframes and receives the downlink control channel repeatedly, on the basis of the confirmed starting subframe and CCE index(es) or ECCE index(es).

Advantageous Effects

In accordance with at least one of embodiments of the present disclosure, a method and an apparatus may be provided for transmitting and receiving a downlink control channel for a MTC UE.

BRIEF DESCRIPTION OF THE DRAWINGS

FIG. 3 is a diagram illustrating four kinds of PDCCH formats.

FIG. 4 is a diagram illustrating the number of EREGs for each ECCE.

FIG. 5 is a diagram illustrating supported EPDCCH formats.

MODE FOR CARRYING OUT THE INVENTION

Hereinafter, some embodiments of the present disclosure will be described in detail with reference to the accompanying drawings. It is to be noted that, in connection with adding reference signs to elements of respective drawings, the same elements are given the same signs, whenever possible, although they may appear on different figures. Furthermore, detailed descriptions of related well-known configurations or functions will be omitted when they are deemed to make the gist of the present disclosure rather unclear.

In the present specification, a MTC UE may refer to a UE that supports low cost (or low complexity) or a UE that supports coverage enhancement, for example. Alternatively, in the present specification, a MTC UE may refer to a UE that is defined by a specific category for supporting low cost (or low complexity) and/or coverage enhancement.

In other words, a MTC UE in the present specification may refer to a newly defined Release 13 low cost (or low complexity) UE category type that performs LTE-based MTC-related operations. Alternatively, a MTC UE in the present specification may refer to a UE category/type defined in existing Release 12 or lower, which supports a coverage improved compared with the existing LTE coverage, or which supports lower power consumption, or a newly defined Release 13 low cost (or low complexity) UE category/type.

Figure 1:
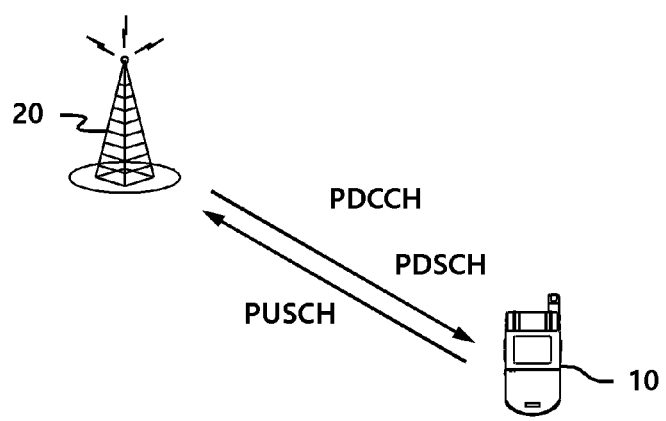
FIG. 1 illustrates an exemplary wireless communication system to which an embodiment of the present disclosure is applied.

FIG. 1 illustrates an exemplary wireless communication system to which an embodiment of the present disclosure is applied.

In accordance with at least one embodiment, a wireless communication system is widely arranged in order to provide various types of communication services, such as voice communication, packet data, and the like. The wireless communication system includes a user equipment (UE) and a base station (BS) or an evolved node B (eNB). As used herein, the UE is used in a comprehensive concept indicating any UE in wireless communication, and is to be interpreted as including not only UE (User Equipment) in wideband code division multiple access (WCDMA), long term evolution (LTE), high speed packet access (HSPA), and the like, but also a mobile station (MS) in global systems for mobile communications (GSM), a user terminal (UT), a subscriber station (SS), a wireless device, and the like.

The BS 20 or cell generally refers to a station that communicates with the UE, and may also be called in other terms, such as a Node-B, an eNB (evolved Node-B), a sector, a site, a BTS (Base Transceiver System), an access point, a relay node, a RRH (Remote Radio Head), a RU (Radio Unit), a small cell, and the like.

That is, the BS 20 or cell in the present specification is to be interpreted in a comprehensive meaning that indicates a partial area or function covered by a BSC (Base Station Controller) in CDMA, a Node-B in WCDMA, an eNB in LTE/LTE-Advanced, or a sector (site), and includes all of various coverage regions such as a mega cell, a macro cell, a micro cell, a pico cell, a femto cell, a relay node, a RRH, a UR, a small cell communication range, and the like.

Each of the above described cells includes a BS for controlling associated cell. Therefore, the BS can be interpreted in two meanings: i) it may indicate a device itself that provides a mega cell, a macro cell, a micro cell, a pico cell, a femto cell, or a small cell in connection with a wireless region, or ii) it may indicate the above wireless region itself. In i), the base station may include devices that provide a predetermined wireless region and are controlled by the same entity and devices that interact with each other to constitute a corresponding wireless region through interworking. According to the wireless region configuration type, the base station may include an eNB, a remote radio head (RRH), an antenna, a radio unit (RU), a low power node (LPN), a point, a transmission/reception point, a transmission point, a reception point, or the like. In ii), the base station may be the wireless region itself, which receives or transmits signals from the viewpoint of the UE or of an adjacent BS.

Therefore, a base station (BS) may be referred to as a mega cell, a macro cell, a micro cell, a pico cell, a femto cell, a small cell, a RRH, an antenna, a RU, a LPN (Low Power Node), a point, an eNB, a transmission/reception point, a transmission point, and a reception point.

In the present specification, the UE and the BS are used in comprehensive meanings as the two transmission/reception entities, which are used to implement the technology or technical idea described in the present specification, and are not limited to specifically indicated terms or words. The UE and the BS are used in comprehensive meanings as the two (uplink or downlink) transmission/reception entities, which are used to implement the technology or technical idea described in the present specification, and are not limited to specifically indicated terms or words. As used herein, the uplink (UL) refers to a scheme of transmitting/receiving data to the BS by the UE, and the downlink (DL) refers to a scheme of transmitting/receiving data to the UE by the BS.

There are no limitations on multiple access techniques applied to wireless communication systems. Various multiple access techniques, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, may be used. An embodiment of the present invention can be applied to resource assignment in the field of asynchronous wireless communication, which is evolving through GSM, WCDMA, and HSPA to LTE and LTE-Advanced, and synchronous wireless communication, which is evolving to CDMA, CDMA-2000, and ultra mobile broadband (UMB). Embodiments of the present disclosure are not to be interpreted as being restricted or limited to a specific wireless communication field, but is to be interpreted as incorporating all technical fields to which the idea of the present invention can be applied.

The uplink transmission and downlink transmission may employ a TDD (Time Division Duplex) scheme, which uses different times to conduct transmission, or a FDD (Frequency Division Duplex) scheme, which uses different frequencies to conduct transmission.

In addition, in a system such as LTE or LTE-Advanced, an uplink and a downlink are configured to constitute a specification with reference to one carrier or a pair of carriers. The uplink and the downlink transmit control information via a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control Channel), or the like, and includes a data channel, such as a PDSCH (Physical Downlink Shared CHannel), a PUSCH (Physical Uplink Shared CHannel), or the like, thereby transmitting data.

On the other hand, it is also possible to transmit control information using an EPDCCH (enhanced PDCCH or extended PDCCH).

In the present specification, a cell may refers to the coverage of signals transmitted from a transmission/reception point, a component carrier having the coverage of signals transmitted from the transmission point or transmission/reception point, or the transmission/reception point itself.

In accordance with at least one embodiment of the present invention, the wireless communication system may be a coordinated multi-point transmission/reception system (CoMP system), in which two or more transmission/reception points cooperate and transmit signals, a coordinated multi-antenna transmission system, or a coordinated multi-cell communication system. The CoMP system may include at least two multi-transmission/reception points and UEs.

The multi-transmission/reception point may be at least one RRH, i) which is connected to a BS, a macro cell (hereinafter, referred to as an "eNB") or the eNB by an optical cable or an optical fiber, ii) is controlled in a wired manner, and iii) which has high transmission power or has low transmission power in the macro cell region.

Hereinafter, a downlink refers to communication or a communication path from a multi-transmission/reception point to a UE, and an uplink refers to communication or a communication path from the UE to the multi-transmission/reception point. In the downlink, a transmitter may be a part of the multi-transmission/reception point, and a receiver may be a part of the UE. In the uplink, the transmitter may be a part of the UE, and the receiver may be part of the multi-transmission/reception point.

Hereinafter, situations in which signals are transmitted/received via a channel, such as a PUCCH, a PUSCH, a PDCCH, an EPDCCH, a PDSCH, and the like, are also described as "signals are transmitted/received via a PUCCH, a PUSCH, a PDCCH, an EPDCCH, a PDSCH, and the like".

Furthermore, a description that a PDCCH is transmitted or received, or that signals are transmitted or received via the PDCCH, may be used in such a meaning as including the description that an EPDCCH is transmitted or received, or signals are transmitted or received via the EPDCCH.

That is, a physical downlink control channel, as used hereinafter, may mean either a PDCCH or an EPDCCH, and is also used in such a meaning as including both the PDCCH and the EPDCCH.

For convenience of description, furthermore, the EPDCCH may also be applied to parts of description with regard to the PDCCH, and the PDCCH may also be applied to parts of description with regard to the EPDCCH in accordance with at least one embodiment.

On the other hand, high layer signaling includes RRC signaling that transmits RRC information including RRC parameters.

The BS or eNB 20 performs downlink transmission to UEs 10. The eNB may transmit a Physical Downlink Shared Channel (PDSCH), a physical downlink control channel (PDCCH), and scheduling grant information. The PDSCH is a main physical channel for unicast transmission, and the PDCCH is a channel for transmitting downlink control information, such as scheduling needed to receive the PDSCH. The scheduling grant information is for transmission in an uplink data channel (for example, a PUSCH (Physical Uplink Shared Channel). It will be described, hereinafter, in such a manner that, when signals are transmitted/received via each channel, the corresponding channel is transmitted/received.

Referring to FIG. 1, the BS 20 transmits DCI (Downlink Control Information) to the UE 10 via a PDCCCH/EPDCCH. The DCI may include downlink scheduling assignment including PDSCH resource information, or the DCI may include an uplink scheduling grant including PUSCH resource information.

Particularly, the BS 20 uses the DCI in order to assign up/down data transmission resources to the UE 10, and the BS 20 transmits the same to the UE 10 using the downlink control channel. The downlink control channel may be classified into a PDCCH and an EPDCCH according to the position of transmission resources used to transmit the DCI.

The PDCCH is transmitted in a control region, which is set through a CFI (Control Format Indicator). The control region is formed over the entire downlink bandwidth, and each subframe includes one to four OFDM symbols according to the CFI setting value.

The EPDCCH is transmitted using the remaining transmission resources excluding the control region inside each subframe. Transmission recourses used for EPDCCH transmission can only be used for a subframe, which is predefined for each UE by high layer signaling (for example, RRC (Radio Resource Control)), and for a plurality of pairs of predefined PRB (Physical Resource Blocks).

The unit of transmission resources, which serves as a default when DCI is transmitted via the PDCCH, may be referred to as a CCE (Control Channel Element). One CCE may include nine REGs (Resource Element Groups), and one REG may include four REs (resource Elements).

The unit of transmission resources, which serves as a default when DCI is transmitted via the EPDCCH, may be referred to as an ECCE (Enhanced CCE). One ECCE may include four or eight EREGs (Enhanced REGs) according to the cyclic prefix length and/or TDD configuration, and one EREG may include a plurality of REs that are variable according to the REs used for RS (Reference Signal) transmission.

The BS 20 may set the number of CCEs used to transmit one DCI via the PDCCH according to the UE channel situation. This is referred to as an aggregation level, and one, two, four, or eight CCEs may be used according to the UE channel situation.

In addition, the BS 20 may set the number of ECCEs used to transmit one DCI via the EPDCCH according to the UE channel situation. This is referred to as an aggregation level, and one, two, four, eight, sixteen, or thirty-two ECCEs may be used according to the UE channel situation.

As described above, the PDCCH/EPDCCH includes a plurality of CCEs/ECCEs, and the BS can transmit a plurality of DCIs to a plurality of UEs with regard to each subframe. In this case, the BS does not separately provide the UE with CCE/ECCE assignment information, which are needed by the UE to receive the DCIs via the PDCCH/EPDCCH (that is, information regarding the CCE aggregation level used to transmit one DCI and information regarding the position of CCE transmission resources); therefore, the UE performs blind decoding, in order to confirm DCIs transmitted to itself, with regard to the possible aggregation level and CCE/ECCE transmission resources.

It is practically impossible, in view of processing delay, for the UE to blind-decode all CCE/ECCE combinations, which are possible for each aggregation level, with regard to all CCEs/ECCEs existing in the PDCCH/EPDCCH; therefore, blind decoding is performed only with regard to a PDCCH candidate/PEDCCH candidate, which includes CCE/ECCE indexes that have been predefined for each UE. The CCE index/ECCE index, which constitutes a PDCCH candidate/EPDCCH candidate for each aggregation level, may be defined as a function of the aggregation level, the value of RNTI (Radio Network Temporary Identifier), and the slot number (or subframe number). The UE may perform blind decoding only with regard to a limited number of PDCCH candidates/EPDCCH candidates for each aggregation level with regard to each subframe.

Figure 2:
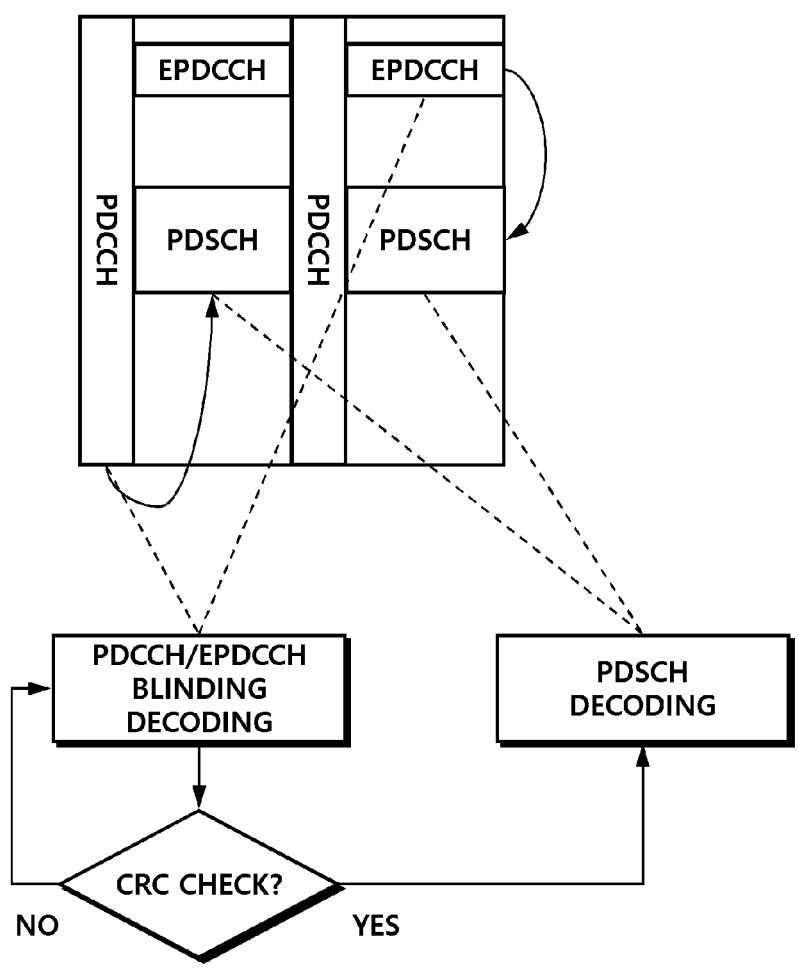
FIG. 2 is a diagram illustrating blind decoding of a PDCCH/EPDCCH and acquisition of PDSCH scheduling information.

As an example, FIG. 2 illustrates a method for blind-decoding a PDCCH/EPDCCH and receiving a PDSCH by a normal UE. Referring to FIG. 2, the UE attempts blind decoding of a PDCCH/EPDCCH with regard to a PDCCH candidate/EPDCCH candidate. The DCI has a CRC (Cyclic Redundancy Check) added thereto, and the UE checks the CRC and confirms a DCI transmitted to itself. When a DCI, which has been transmitted to itself, is confirmed as a result of CRC check, the UE acquires downlink scheduling information included in the DCI, and the UE decodes the PDSCH using downlink data transmission resources in the same subframe as the subframe via which the DCI has been transmitted.

FIG. 2 illustrates blind decoding of the PDCCH/EPDCCH and acquisition of PDSCH scheduling information. According to a scheme similar to that of FIG. 2, PUSCH scheduling information can also be acquired by blind-decoding the PDCCH/EPDCCH.

As DCI (Downlink Control Information) transmission channels for UEs in a typical 3GPP LTE/LTE-Advanced system, a PDCCH, which has been defined in a system of Rel-10 or lower, and an EPDCCH, which has been newly defined in a Rel-11 system, are used.

FIG. 3 is a diagram presenting four kinds of PDCCH formats. In the case of the PDCCH, four PDCCH formats are used for transmission, as in FIG. 3, for the purpose of the UE's downlink wireless channel quality and link adaption according to the DCI size. In FIG. 4, the number of CCEs indicates the aggregation level.

FIG. 4 is a diagram presenting the number of EREGs for each ECCE. In FIG. 4, $N_{EREG}^{ECCE}$ (number of EREGs per ECCE) is determined according to subframe characteristics. In the case of a normal cyclic prefix, $N_{EREG}^{ECCE}$ becomes 4 at a normal subframe or a special subframe of configuration 3, 4, 8. On the other hand, in the case of an extended cyclic prefix, $N_{EREG}^{ECCE}$ becomes 8 at a normal subframe or a special subframe of configuration 1, 2, 3, 5, 6.

FIG. 5 is a diagram regarding supported EPDCCH formats. In FIG. 5, the formats are divided into case A and case B, each of which is classified into five cases according to localized transmission and distributed transmission, respectively.

That is, also in the case of the EPDCCCH, five EPDCCH formats are used for transmission, according to FIG. 4 and FIG. 5, for the purpose of link adaptation for DCI transmission.

[LTE-Based Low-Priced MTC]

As LTE networks become widespread, mobile communication providers want to minimize the number of RATs (Radio Access Terminals) in order to reduce the costs for maintenance and repair of the networks. However, MTC products based on typical GSM/GPRS networks are on the increase, and MTC using low data transmission rates can be provided at low costs. Therefore, from viewpoint of mobile communication providers, use of LTE networks for normal data transmission and use of GSM/GPRS networks for MTC have a problem in that two RATs need to be operated separately. Such inefficient use of frequency bands is a burden on profits of the mobile communication providers.

In order to solve such a problem, inexpensive MTC UEs that use GSM/EGPRS networks need to be replaced with MTC UEs that use LTE networks, and various requirements for reducing the price of LTE MTC UEs are being proposed to this end.

Examples of technologies for supporting the low-priced LTE MTC UEs include narrow band support, a single RF chain, a half duplex FDD, a long DRX (Disconnected Reception), and the like. However, above methods, which are considered to lower the prices, may decrease the performance of MTC UEs compared with conventional LTE UEs.

In addition, about 20% of MTC UEs, which support a MTC service such as smart metering, are installed in a "deep indoor" environment, such as a basement, so that, for the purpose of successful MTC data transmission, the coverage of LTE MTC UEs need to be improved about 20 dB compared with the coverage of typical normal LTE UEs. Furthermore, when a decrease in performance resulting from the specification change is additionally considered, the coverage of LTE MTC UEs needs to be improved more than about 20 dB.

In order to improve the coverage while lowering the price of LTE MTC UEs as described above, various methods for robust transmission are being considered for each physical channel, such as PSD boosting, a low coding rate, and time domain repetition. Requirements of LTE-based low-priced MTC UEs are as follows:

1) The data transmission rate needs to at least satisfy the data transmission rate provided by EGPRS-based MTC UEs, particularly, downlink 118.4 kbps and uplink 59.2 kbps.

2) The frequency efficiency needs to be improved greatly compared with GSM/EGPRS MTC UEs.

3) The provided service region should not be smaller than that provided by GSM/EGPRS MTC UEs.

4) The power consumption should not be larger than that of GSM/EGPRS MTC UEs.

5) Legacy LTE UEs and LTE MTC UEs need to be able to use the same frequency.

6) Existing LTE/SAE networks are reused.

7) Optimization is performed not only in the FDD mode, but also in the TDD mode.

8) Low-priced LTE MTC UEs need to support limited mobility and low power consumption modules.

In existing LTE-LTE-Advanced systems, transmission of a PDCCH/EPDCCH for transmitting scheduling control information regarding a specific UE or a group of UEs or other downlink control information has been conducted via one downlink subframe.

However, in order to provide a coverage improved by about 20 dB, compared with normal LTE UEs, for low-priced MTC UEs, transmission of a PDCCH or an EPDCCH, which has been conducted with regard to a single downlink subframe, needs to be repeated via a plurality of downlink subframes, and the corresponding MTC UE needs to combine PDCCHs or EPDCCHs, which have been received via the corresponding plurality of downlink subframes, and thereby perform decoding. When a PDCCH or an EPDCCH for low-priced MTC UEs is transmitted as described above, and when repetition regarding the corresponding channel is supported, there is a need to define a PDCCH/EPDCCH format for performing PDCCH/EPDCCH decoding by the corresponding MTC UE.

Figure 6:
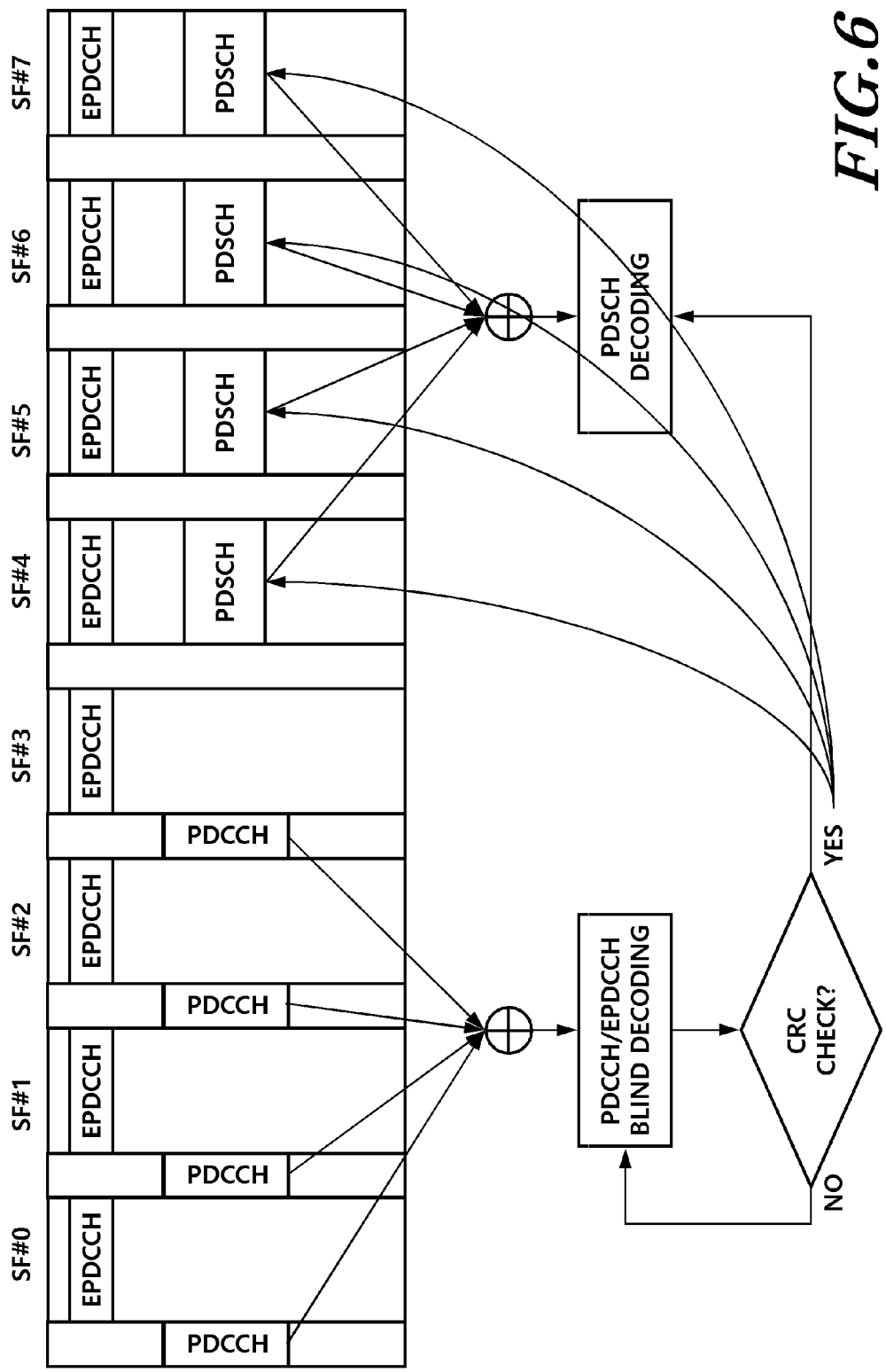
FIG. 6 illustrates an exemplary method for blind-decoding a PDCCH or an EPDCCH and receiving a PDSCH by a MTC UE.

FIG. 6 is a diagram illustrating an exemplary method for blind-decoding a PDCCH or an EPDCCH and receiving a PDSCH by a MTC UE.

In the example of FIG. 6, the BS considers the UE's channel situation and repeatedly transmits one DCI via four subframes of SF#0 (subframe number #0) to SF#3 (subframe number #3). In addition, the BS considers the UE's channel state and repeatedly transmits the same data via four subframes of SF#3 to SF#6. The UE soft-combines received DCI values, which have been transmitted via SF#0 to SF#3, and blind-decodes the same; if CRC check is successful, the UE confirms PDSCH scheduling information included in the DCI. The UE soft-combines received data values, which have been transmitted via SF#3 to SF#6, and the UE performs decoding.

When a PDCCH or an EPDCCH for low-priced MTC UEs is transmitted as described above, and when repetition regarding the corresponding channel is supported, successful decoding by the corresponding MTC UE requires a definition regarding the corresponding repetition number and a search space including repetition.

In accordance with at least one embodiment, a scheme may be defined for setting a PDCCH/EPDCCH search space for MTC UEs. More specifically, in connection with a scheme for determining DL subframe(s) for configuring a N-times repeatedly transmitted PDCCH/EPDCCH candidate m, a method and an apparatus are provided for setting a search space that constitutes CCE/ECCE index(es), which have been assigned for the corresponding PDCCH/EPDCCH candidate m in respective N DL subframe(s) in accordance with at least one embodiment. Hereinafter, such a method and apparatus will be described.

In the case of a UE set to receive a DCI via a PDCCH in an existing 3GPP LTE/LTE-Advanced system, a search space for the corresponding UE, $S_k(L)$, is configured as a set of PDCCH candidates that are defined to be monitored for downlink control information reception in a specific downlink subframe k. A specific PDCCH candidate m, which has an aggregation level L (where, $L \in \{1,2,4,8\}$) that constitutes the corresponding $S_k(L)$, is defined by equation (1) below:

$$L\{Y_k + m'\} \bmod \lfloor N_{CCE,k}/L \rfloor\} + i \qquad \text{Equation (1)}$$

In Equation (1), $i=0, \ldots, L-1$; when cross-carrier scheduling has been set, $m'=m+M^{(L)} \cdot n_{CI}$; and, when cross-carrier scheduling has not been set, $m'=m$ ($n_{CI}$ indicates a CIF (Carrier Indicator Field) value included in the corresponding DCI). In addition, $m=0, \ldots, M^{(L)}-1$; $M^{(L)}$ indicates the number of PDCCH candidates defined to be monitored by the UE with regard to the aggregation level L; and $N_{CCE,k}$ indicates the number of CCEs that constitute a PDCCH control region in the corresponding DL subframe k.

Additionally, the value of $Y_k$ in equation (1) is determined by equation (2) below:

$$Y_k = (A \cdot Y_{k-1}) \bmod D \qquad \text{Equation (2)}$$

In Equation (2), $Y_{-1} = n_{RNTI} \neq 0$, $A = 39827$, $D = 65537$, $k = \lfloor n_s/2 \rfloor$, where $n_s$ has a slot number value.

In the case of a MTC UE, however, the corresponding PDCCH is not transmitted via a single downlink subframe, but the same may be repeatedly transmitted via N downlink subframes according to the PDCCH repetition number or the definition of a new PDCCH format for the MTC UE; therefore, the corresponding search space needs to be extended to the downlink subframe domain and defined.

Therefore, as a scheme for determining a search space that configures a specific N-times repeated PDCCH candidate m, N being defined as the repetition number, a first scheme 1 may determine DL subframe index(es) that constitute the corresponding N-times repeated PDCCH candidate, and a second scheme 2 may define a search space setting equation that defines CCE index(es) that constitute the corresponding N-times repeated PDCCH candidate in respective N DL subframes. Similarly, in the case of an EPDCCH, the first and second schemes 1 and 2, described below, can be applied in the same manner; in this case, the PDCCH may be changed to the EPDCCH, and the CCE may be changed to the ECCE.

Figure 7:
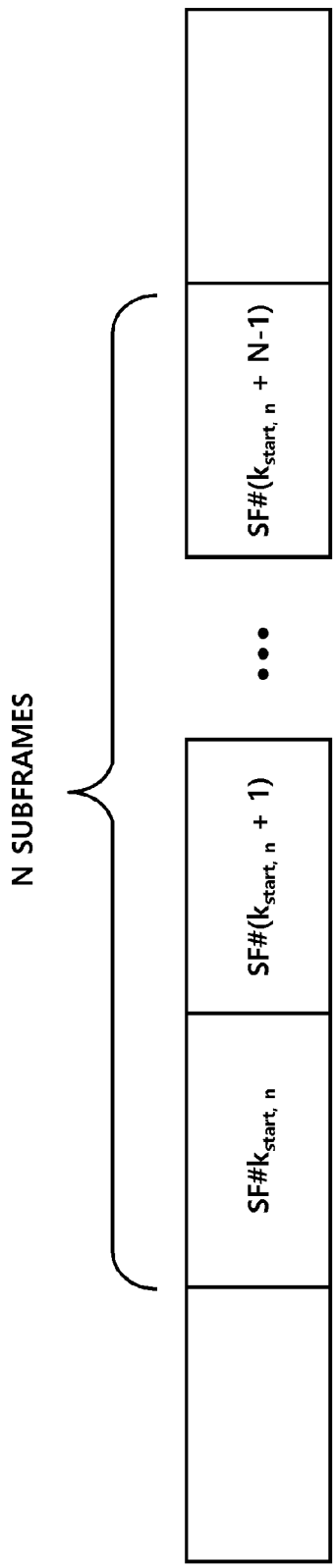
FIG. 7 is a diagram illustrating an exemplary subframe via which a PDCCH/EPDCCH is transmitted repeatedly.

FIG. 7 is a diagram illustrating an exemplary subframe via which a PDCCH/EPDCCH is repeatedly transmitted.

In the example of FIG. 7, as a method for determining a downlink subframe that constitutes an N-time repeated PDCCH/EPDCCH candidate m based on an aggregation level L, i) a downlink subframe $k_{start,n}$ for starting N-times repeated PDCCH/EPDCCH transmission is determined, and ii) the PDCCH/EPDCCH may be N times repeatedly transmitted via N consecutive downlink subframes starting from downlink subframe SF#$k_{start,n}$, that is, SF#$k_{start,n}$ to SF#($k_{start,n}$+N−1).

First Scheme 1: DL Subframe that Starts PDCCH/EPDCCH Repetition for MTC UEs

A scheme for determining DL subframe(s) that constitute an N-times repeated PDCCH candidate m will be proposed.

As a method for determining DL subframe(s) that constitute an N-times repeated PDCCH candidate m based on an aggregation level L, a DL subframe $k_{start,n}$ may be defined. The DL subframe $k_{start,n}$ starts the corresponding N-times repeated PDCCH transmission. A definition may be made such that the corresponding N-times repeated PDCCH transmission is performed via N consecutive DL subframes from DL subframe #$k_{start,n}$ to DL subframe #($k_{start,n}$+N−1).

In this case, the downlink subframe $k_{start,n}$, which starts the corresponding PDCCH repetition, may be determined by the number N of the corresponding PDCCH repetition, and, as an embodiment in this regard, the corresponding $k_{start,n}=\lfloor n_s/2 \rfloor$ may be determined as a value satisfying equation (3) below:

$$(M+\lfloor n_s/2 \rfloor) \bmod N = 0 \qquad \text{Equation (3)}$$

In Equation (3), M refers to the SFN (System Frame Number) value, and $n_s$ refers to the slot number. It is also possible to define the corresponding mod value of equation (3) so as to have any natural number value smaller than N, which is not 0. Alternatively, the aggregation level L may be defined as a parameter of an equation that determines corresponding DL subframe(s), as in equation (4) below:

$$(M+L+\lfloor n_s/2 \rfloor) \bmod N = 0 \qquad \text{Equation (4)}$$

Equations (3) and (4) are functions of the repetition number N or functions of repetition number N and L. Equations (3) and (4) may be embodiments that determine DL subframe(s) via which corresponding PDCCH repetition occurs. Accordingly, embodiments of the present disclosure are not limited thereto. For example, other types of equations, which are functions of corresponding N or functions of N and L, and which determine DL subframe(s), may also fall within the scope of embodiments of the present disclosure.

As another method for determining a DL subframe index $k_{start,n}$, which starts corresponding PDCCH transmission, for defining DL subframe(s) that constitute an N-times repeated PDCCH candidate m, a definition may be made such that the corresponding starting subframe index value is directly set according to each repetition number N value and is transmitted to each MTC UE via a cell-specific or UE-specific higher layer signaling. As an exemplary method for setting the starting DL subframe index $k_{start,n}$ for monitoring of an N-times repeated PDCCH candidate m based on the corresponding higher layer signaling, it is possible to set and signal a starting DL subframe index for monitoring of the corresponding N-times repeated PDCCH candidate m with regard to a DL subframe having a predetermined period, similar to existing PEDCCH monitoring subframe setting schemes.

As another method for defining DL subframe(s) that constitute the N-times repeated PDCCH candidate m, the corresponding BS may cause each MTC UE to directly set N DL subframe index(s), which constitute the corresponding N-times repeated PDCCH candidate m, via cell-specific or UE-specific higher layer signaling. In this case, corresponding N DL subframe(s) may be assigned non-continuously. To this end, a definition may be made such that N DL subframe(s) having a predetermined period P are assigned. In this case, corresponding N DL subframe(s) may be assigned in a bitmap type with regard to all DL subframes within the corresponding period P (in the case of FDD, the number of corresponding DL subframes may be P, and, in the case of TDD, the number may be smaller than P); however, specific signaling schemes for assigning corresponding N DL subframe(s) are not limited in any manner.

Second Scheme 2: Search Space Configuration for N-Times Repeated PDCCH/EPDCCH

Following the above-described scheme for determining DL subframe(s) for configuring the N-times repeated PDCCH candidate m, a scheme for setting a search space that constitutes CCE index(es) assigned for the corresponding PDCCH candidate m in respective N DL subframe(s) will now be proposed.

As a first method for determining a search space that configures the corresponding N-times repeated PDCCH candidate m in respective DL subframe(s), existing equation (1) may be applied. Particularly, a search space $\{S_k(L,N)\}$ set in respective DL subframe(s) for the N-times repeated PDCCH candidate m for a specific MTC UE can therefore be determined as in equation (5) below:

$$L\{(Y_k+m') \bmod \lfloor N_{CCE,k}/L \rfloor\}+1 \text{ where, } k=k_{start,n}, \ldots, k_{start,n}+N-1 \qquad \text{Equation (5)}$$

As another method for determining a search space that configures the corresponding N-times repeated PDCCH candidate m in respective DL subframe(s), modified $S_k(L,N)$ for MTC UEs can be defined using equation (6) below and by adding N as a parameter:

$$L\{(Y_k+N+m') \bmod \lfloor N_{CCE,k}/L \rfloor\}+1 \text{ where, } k=k_{start,n} \ldots, k_{start,n}+N-1 \qquad \text{Equation (6)}$$

It is to be noted that equation (6) above is only an embodiment of the search space determination equation including the repetition number N as a parameter, and the type of search space setting equations, including corresponding N, is not limited thereto. The embodiments of the present disclosure are not limited thereto. That is, in connection with defining the corresponding search space setting equation, another type of search space setting equation can fall within the scope of the present invention.

As another method for determining a search space that configures the corresponding N-times repeated PDCCH candidate m in respective DL subframe(s), it may define CCE index(es) assigned in a following downlink subframe by CCE index(es) defined by DL subframe #$k_{start,n}$, which is a DL subframe that starts the N-times repeated PDCCH transmission. Specifically, when PCDDH repetition has been conducted N times in N consecutive downlink subframes from downlink subframe $k_{start,n}$ to downlink subframe $k_{start,n}$+N−1 for the purpose of DCI transmission for a specific MTC UE, a definition may be made such that, as the CCE index(es) assigned in each of following (N−1) downlink subframes from downlink subframe $k_{start,n}$+1 to $k_{start,n}$+N−1 for the purpose of corresponding N-times repeated PDCCH transmission, the same CCE index(es) are used as the CCE index(es) that have been used to transmit the corresponding PDCCH in the first downlink subframe $k_{start,n}$. Particularly, a definition may be made in the following manner: CCE index(es) $S_{kstart,n}^{(L,N)}$ in the first DL subframe #$k_{start,n}$ that constitutes the corresponding N-times repeated candidate m are determined according to equation (5) or (6) given above, and CCE index(es) that constitute the corresponding N-times repeated PDCCH candidate m in DL subframe #($k_{start,n}$+1) to DL subframe #($k_{start,n}$+N−1) accordingly follow $S_{kstart,n}^{(L,N)}$.

As another method for determining a search space that configures the corresponding N-times repeated PDCCH candidate m in respective DL subframe(s), CCE index(es) that constitute respective repetition level-wise PDCCH candidate(s) may be set semi-statically via UE-specific or cell-specific RRC signaling. In this case, each aggregation level L and repetition level, N-wise CCE starting offset value, and $CCE_{L,N}$ may be signaled. Specifically, it will be assumed, in connection with a specific aggregation level L-based PDCCH transmission, that the number of repetition of the corresponding PDCCH is N, and the number of N-times repeated PDCCH monitoring candidates is C: among the first DL subframe #$k_{start,n}$ to DL subframe #($k_{start,n}$+N−1), which constitute the corresponding N-times repeated candidate m, the corresponding first N-times repeated PDCCH candidates are configured by $CCE_{L,N}$ to $CCE_{L,N}$+L−1, respectively; the second CCE is configured by $CCE_{L,N}$+L to $CCE_{L,N}$+2L−1; and, in a similar manner, the $C^{th}$ N-times repeated PDCCH candidate is configured by $CCE_{L,N}$+(C−1)L to $CCE_{L,N}$+CL−1. The schemes for setting a search space according to the present invention can be applied no matter what value the N value has, and there is no limitation on the combination thereof in connection with applying the above-mentioned method for setting DL subframe indexes for the N-times repeated PDCCH candidate m and the method for configuring CCEs in respective DL subframes; furthermore, even when independently proposed methods are applied, the same still can fall within the scope of the present invention.

It would be obvious that the proposals made by the present disclosure can also be applied when DCI for a MTC UE is transmitted via an EPDCCH, that is, in connection with a method for configuring an N-times repeated EPDCCH candidate. Therefore, the first and second schemes 1 and 2 according to embodiments of the present disclosure have been described in connection with a PDCCH solely for the purpose of better understanding, and the same schemes can be applied also in the case of an EPDCCH. In such a case, the PDCCH is to be understood as the EPDCCH, and the CCE is to be understood as the ECCE.

Figure 8:
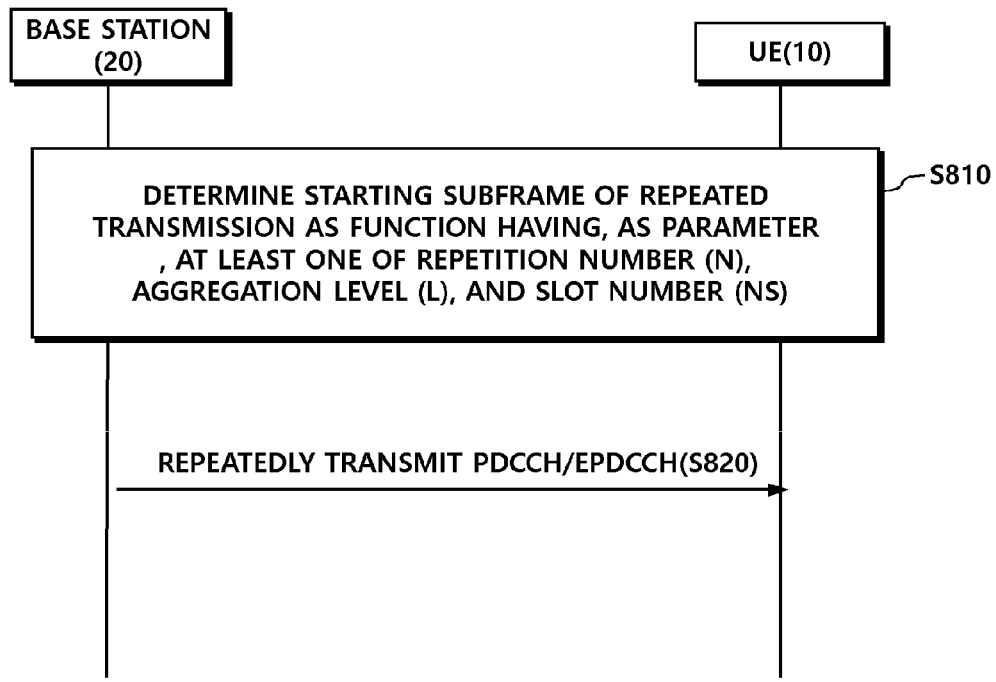
FIG. 8 is a diagram illustrating a process of determining, by a base station, a repeated transmission starting subframe in scheme 1 according to an embodiment of the present disclosure.

FIG. 8 is a diagram illustrating a process of determining, by a BS, a repeated transmission starting subframe in a first scheme 1 according to an embodiment of the present disclosure.

The BS 20 and the UE 10 use at least one of the number N of repeated transmission, the aggregation level L, and the slot number $n_s$ as in equation (3) or equation (4) in the first scheme 1. Particularly, the repeated transmission starting subframe can be confirmed by a function having at least one of the N, L, and $n_s$ as parameters (S810). The BS 20 then repeatedly transmits a PDCCH/EPDCCH to the UE 10 via the confirmed starting subframe, and the UE 10 receives the same (S820).

Figure 9:
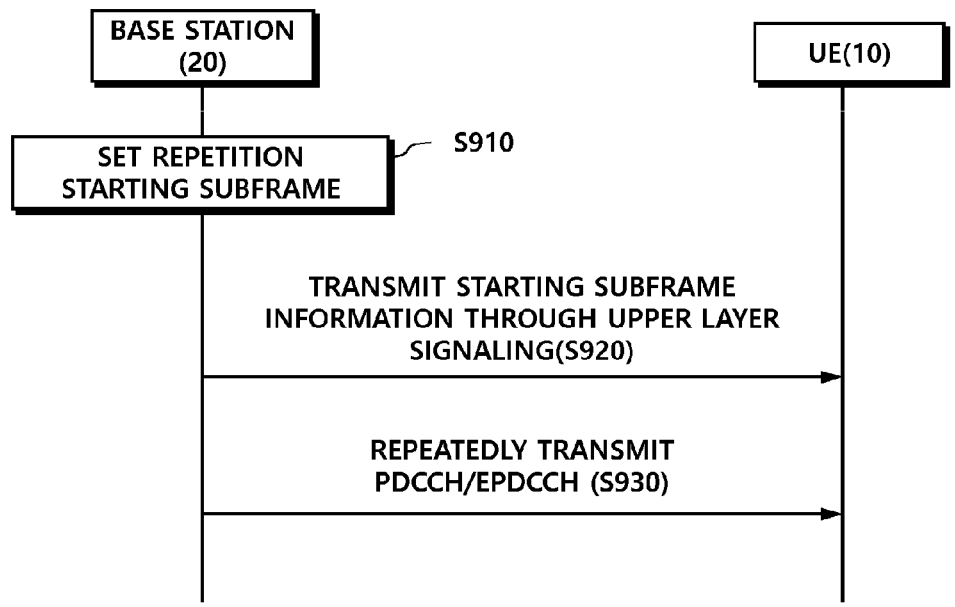
FIG. 9 is a diagram illustrating a process of determining and signaling a repeated transmission starting subframe, by a base station, in scheme 1 according to another embodiment of the present disclosure.

FIG. 9 is a diagram illustrating a process of determining and signaling, by a BS, a repeated transmission starting subframe in a first scheme 1 according to another embodiment of the present disclosure.

Referring to FIG. 9, according to another embodiment of the first scheme 1, the BS 20 sets a repetition starting subframe (S910) and transmits information regarding the starting subframe to the UE using higher layer signaling (S920). As a result, the UE 10 can confirm which subframe is the subframe that starts repeated transmission. Thereafter, the BS 20 repeatedly transmits a PDCCH/EPDCCH to the UE 10 via the confirmed starting subframe, and the UE 10 receives the same (S930).

Figure 10:
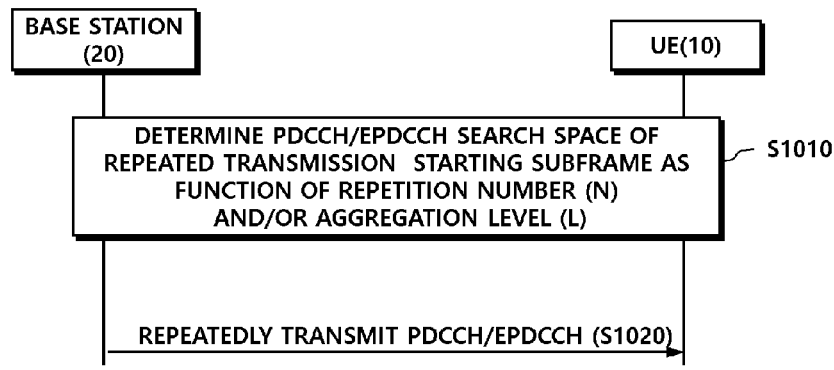
FIG. 10 is a diagram illustrating a process of determining, by a base station, a CCE/ECCE index(es) in scheme 2 according to an embodiment of the present disclosure.

FIG. 10 is a diagram illustrating a process of determining, by a BS, CCE/ECCE index(es) in a second scheme 2 according to an embodiment of the present disclosure.

Referring to FIG. 10, the BS 20 can calculate a search space of a PDCCH/EPDCCH, which is to be transmitted repeatedly, using the number N of repeated transmission and the aggregation level, as in equation (5) or equation (6). Specifically, the BS 20 and the UE 10 determines a PDSCH/EPDSCH search space of a repetition transmission starting subframe, in a type promised in advance, as a function of the repetition number N and/or the aggregation level L (S1010). Thereafter, the BS 20 repeatedly transmits a PDCCH/EPDCCH to the UE 10 via the confirmed starting subframe, and the UE 10 receives the same (S1020).

Figure 11:
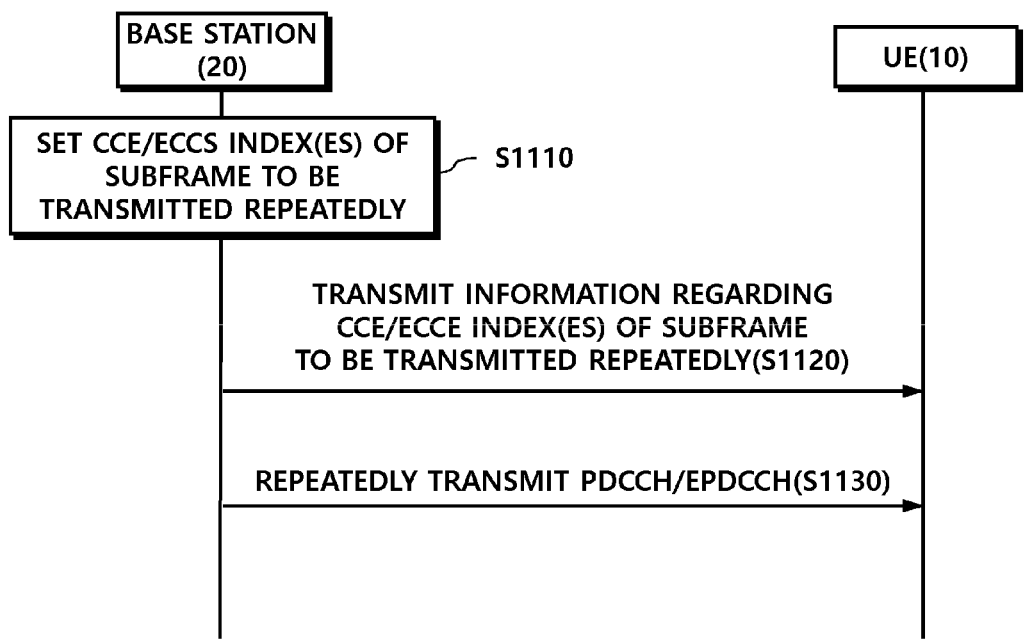
FIG. 11 is a diagram illustrating a process of determining and signaling a CCE/ECCE(es), by a base station, in scheme 2 according to another embodiment of the present disclosure.

FIG. 11 is a diagram illustrating a process of determining and signaling, by a BS, CCE/ECCE index(es) in a second scheme 2 according to another embodiment of the present invention.

Referring to FIG. 11, the BS 20 sets a CCE/ECCE of a subframe to be transmitted repeatedly (S1110). The BS 20 transmits information regarding the CCE/ECCE to the UE 10 via higher layer signaling (S1120). As a result, the UE 10 secures information regarding the CCE/ECCE, which is to be monitored. Thereafter, the BS 20 repeatedly transmits a PDCCH/EPDCCH to the UE 10 via the confirmed starting subframe, and the UE 10 receives the same (S1130).

The first scheme 1 of FIG. 8 and FIG. 9 and the second scheme 2 of FIG. 10 and FIG. 11 can be selected and combined, respectively, to configure embodiments of the present disclosure.

Following the schemes for determining DL subframe(s) for configuring the N-times repeatedly transmitted PDCCH/EPDCCH candidate m, a method and an apparatus for setting a search space that constitutes CCE index(es) or ECCE index(es), which have been assigned for the corresponding PDCCH/EPDCCH candidate m in respective N DL subframe(s), will hereinafter be described.

Figure 12:
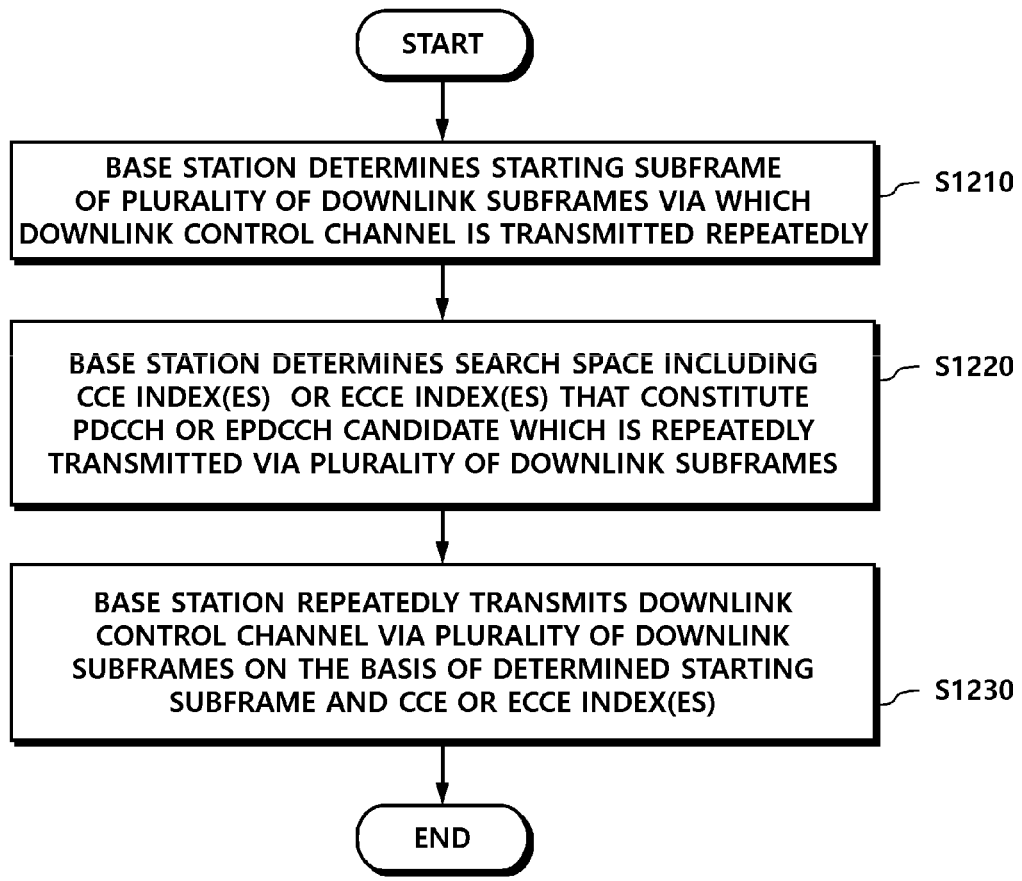
FIG. 12 is a diagram illustrating a process of operation of a base station according to an embodiment of the present disclosure.

FIG. 12 is a diagram illustrating operation of a BS according to an embodiment of the present disclosure.

A process of transmitting a downlink control channel to a UE by a BS is illustrated. The BS determines a starting subframe of a plurality of downlink subframes for repeatedly transmitting a downlink control channel (S1210). The BS determines a search space including CCE index(es) or ECCE index(es) that constitute a PDCCH or EPDCCH candidate, which is repeatedly transmitted via the plurality of downlink subframes (S1220). The BS repeatedly transmits the downlink control channel via the plurality of downlink subframes, on the basis of the determined starting subframe and the CCE index(es) or ECCE index(es) (S1230).

When the first scheme 1 of FIG. 8 is applied, step S1210 includes conducting a calculation using at least one of the number N of repeated transmission, the aggregation level L, and the slot number $n_s$. This may be preceded by a process of determining an equation or an application scheme, with the UE, in connection with using equation (3) or equation (4). When the first scheme 1 of FIG. 9 is applied, step S1210 further includes a step of setting, in the UE, a subframe index of the starting subframe via higher layer signaling.

When the second scheme 2 of FIG. 10 is applied, step S1220 may include conducting a calculation using respective downlink subframes for the repeated transmission, or slot indexes, the number of entire CCEs or ECCEs configured in respective downlink subframes, the RNTI of the UE, the number N of repeated transmission, and/or the aggregation level L. This may be preceded by a process of determining an equation or an application scheme, with the UE, in connection with using equation (5) or equation (6). When the second scheme 2 of FIG. 11 is applied, step S1220 may further include setting, in the UE, information regarding CCE index(es) or ECCE index(es), which are assigned to a search space for a PDCCH or EPDCCH candidate in the plurality of downlink subframes, via higher layer signaling.

The higher layer signaling may be, as described above, one of cell-specific higher layer signaling and UE-specific higher layer signaling.

Figure 13:
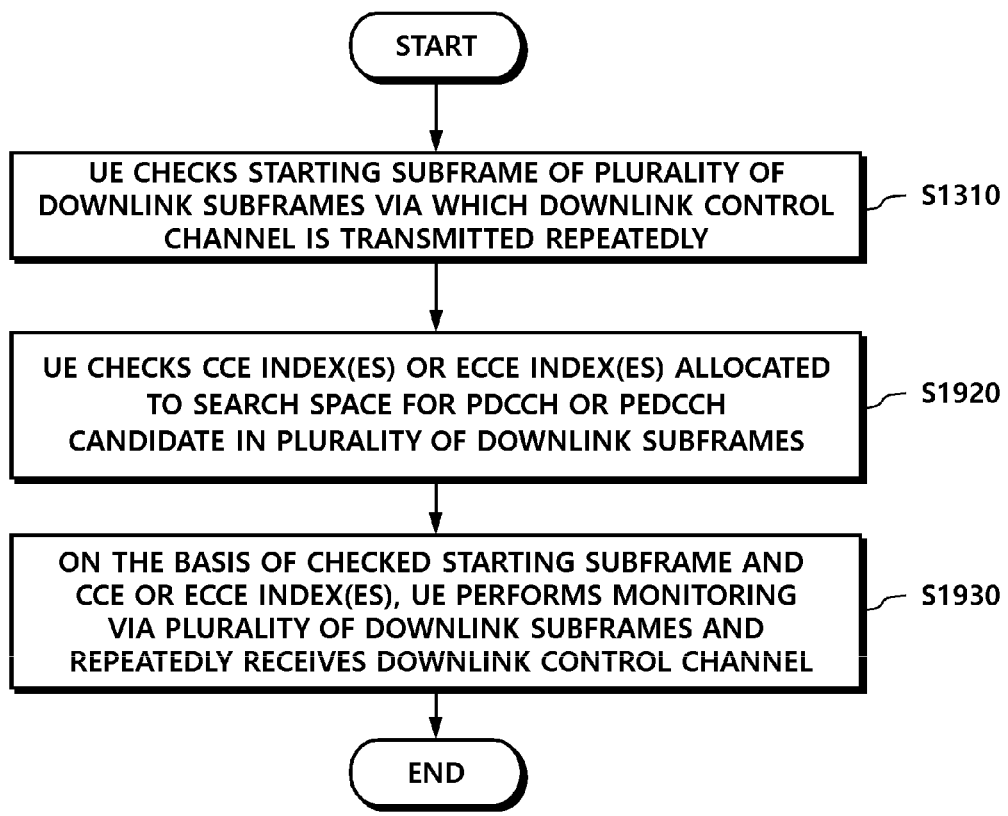
FIG. 13 is a diagram illustrating a process of operation of a UE according to an embodiment of the present disclosure.

FIG. 13 is a diagram illustrating operation of a UE according to an embodiment of the present invention.

A process of receiving a downlink control channel from a BS by a UE is illustrated. The UE confirms a starting subframe of a plurality of downlink subframes for repeatedly transmitting a downlink control channel (S1310). The UE confirms CCE index(es) or ECCE index(es) that are assigned to a search space for a PDCCH or EPDCCH candidate in the plurality of downlink subframes (S1320). The confirmations in steps S1310 and S1320 may occur simultaneously or at a time interval. On the basis of the confirmed starting subframe and the CCE index(es) or ECCE index(es), the UE performs monitoring via the plurality of downlink subframes and repeatedly receives the downlink control channel (S1330).

When the first scheme 1 of FIG. 8 is applied, the confirmation scheme of FIG. 1310 may be as follows: the UE calculates the index of the starting subframe using at least one of the number N of repeated transmission, the aggregation level L, and the slot number $n_s$. This may be preceded by a process of determining an equation or an application scheme, with the BS, in connection with using equation (3) or equation (4). When the first scheme 1 of FIG. 9 is applied, the confirmation scheme of S1310 further includes a step of receiving the subframe index of the starting subframe from the BS via higher layer signaling.

When the second scheme 2 of FIG. 10 is applied, in order to implement the confirmation scheme of step S1320, the UE can conduct a calculation using respective downlink subframes for the repeated transmission, or slot indexes, the number of entire CCEs or ECCEs configured in respective downlink subframes, the RNTI of the UE, the number N of repeated transmission, and/or the aggregation level L. This may be preceded by a process of determining an equation or an application scheme, with the BS, in connection with using equation (5) or equation (6). When the second scheme 2 of FIG. 11 is applied, in order to implement the confirmation scheme of S1320, the UE may receive information regarding CCE index(es) or ECCE index(es), which are assigned to a search space for a PDCCH or EPDCCH candidate in the plurality of downlink subframes, from the BS via higher layer signaling.

The higher layer signaling may be, as described above, one of cell-specific higher layer signaling and UE-specific higher layer signaling.

Figure 14:
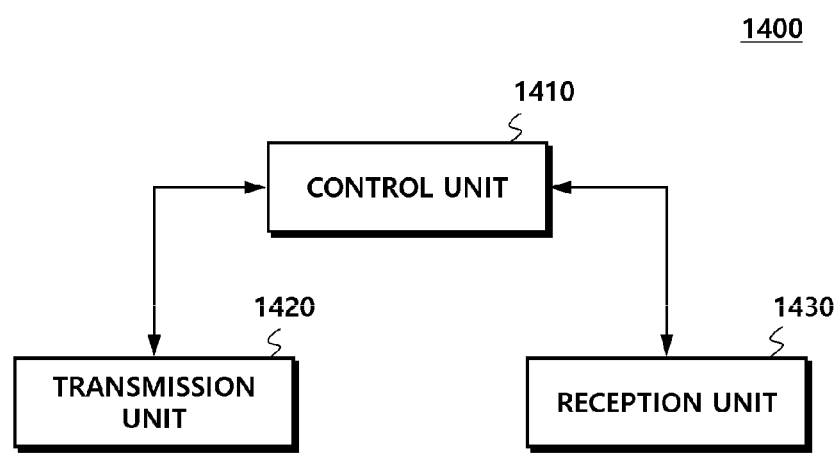
FIG. 14 is a diagram illustrating the configuration of a base station according to still another embodiment of the present disclosure.

FIG. 14 is a diagram illustrating configuration of a BS according to still another embodiment.

Referring to FIG. 14, a BS 1400 according to still another embodiment includes a control unit 1410, a transmission unit 1420, and a reception unit 1430.

The control unit 1410 controls the overall operation of the BS, following setup of a search space for PDCCH monitoring by a MTC (Machine Type Communication) UE, in connection with a method for transmitting a downlink control channel for a MTC UE in a 3GPP LTE/LTE-A system, which is needed to perform operations in accordance with embodiments of the present disclosure described above.

The transmission unit 1420 and the reception unit 1430 are used to transmit/receive signals, messages, or data, which are needed to operations in accordance with embodiments of the present disclosure described above, with the UE.

To be more specific, the BS 1400 transmits a downlink control channel. To this end, the control unit 1410 determines the starting subframe of a plurality of downlink subframes for repeatedly transmitting the downlink control channel. The control unit 1410 determines a search space including CCE index(es) or ECCE index(es) that constitute a PDCCH or EPDCCH candidate, which is repeatedly transmitted via the plurality of downlink subframes. In addition, the transmission unit 1420 repeatedly transmits the downlink control channel via the plurality of downlink subframes on the basis of the determined starting subframe and the CCE index(es) or ECCE index(es).

When the first scheme 1 of FIG. 8 is applied, the control unit 1410 can determine the starting subframe using at least one of the number N of repeated transmission, the aggregation level L, and the slot number $n_s$. This may be preceded by a process of determining an equation or an application scheme, with the UE, in connection with using equation (3) or equation (4). When the first scheme 1 of FIG. 9 is applied, the control unit 1410 can control the transmission unit 1420 such that the subframe index of the starting subframe is set in the UE via higher layer signaling.

When the second scheme 2 of FIG. 10 is applied, the control unit 1410 can conduct a control such that the CCE index(es) or ECCE index(es) are determined using respective downlink subframes for the repeated transmission, or slot indexes, the number of entire CCEs or ECCEs configured in respective downlink subframes, the RNTI of the UE, the number N of repeated transmission, and/or the aggregation level L. This may be preceded by a process of determining an equation or an application scheme, with the UE, in connection with using equation (5) or equation (6). When the second scheme 2 of FIG. 11 is applied, the control unit 1410 can control the transmission unit 1420 such that information regarding CCE index(es) or ECCE index(es), which are assigned to a search space for a PDCCH or EPDCCH candidate in the plurality of downlink subframes, is set in the UE via higher layer signaling.

Figure 15:
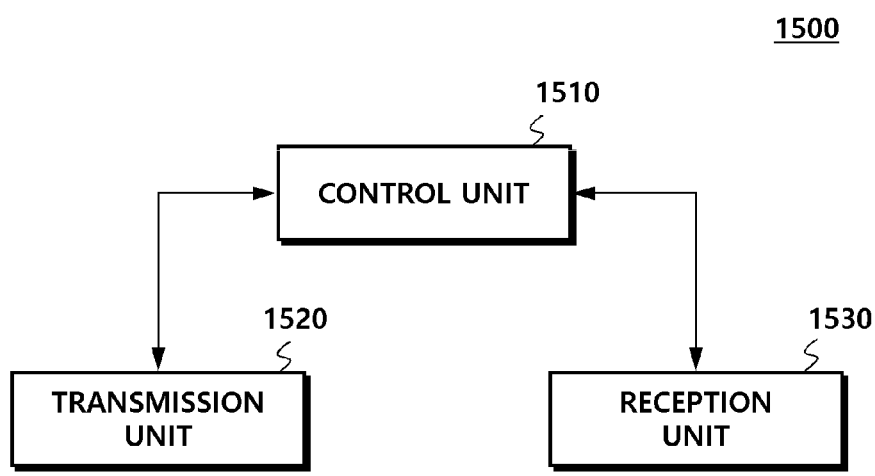
FIG. 15 is a diagram illustrating the configuration of a UE according to still another embodiment of the present disclosure.

FIG. 15 is a diagram illustrating configuration of a UE according to still another embodiment.

Referring to FIG. 15, a UE 1500 according to still another embodiment includes a reception unit 1530, a control unit 1510, and a transmission unit 1520.

The reception unit 1530 receives downlink control information, data, and messages from the BS via the corresponding channel.

The control unit 1510 controls the overall operation of the UE, following setup of a search space for PDCCH monitoring by a MTC (Machine Type Communication) UE, in connection with a method for transmitting a downlink control channel for a MTC UE in a 3GPP LTE/LTE-A system, which is needed to perform operations associated with embodiments of the present disclosure described above.

The transmission unit 1520 transmits uplink control information, data, and messages to the BS via the corresponding channel.

To be more specific, the UE 1500 receives a downlink control channel, the control unit 1510 confirms the starting subframe of a plurality of downlink subframes for repeatedly transmitting the downlink control channel, and the control unit 1510 confirms CCE index(es) or ECCE index(es) that are assigned to a search space for a PDCCH or EPDCCH candidate in the plurality of downlink subframes.

When the first scheme 1 of FIG. 8 is applied, the control unit 1510 can confirm the starting subframe using at least one of the number N of repeated transmission, the aggregation level L, and the slot number $n_s$. This may be preceded by a process of determining an equation or an application scheme, with the BS, in connection with using equation (3) or equation (4). When the first scheme 1 of FIG. 9 is applied, the control unit 1510 can control the reception unit 1530 such that the reception unit 1530 receives the subframe index of the starting subframe from the BS via higher layer signaling.

When the second scheme 2 of FIG. 10 is applied, the control unit 1510 can calculate the CCE index(es) or ECCE index(es) using respective downlink subframes for the repeated transmission, or slot indexes, the number of entire CCEs or ECCEs configured in respective downlink subframes, the RNTI of the UE, the number N of repeated transmission, and/or the aggregation level L. This may be preceded by a process of determining an equation or an application scheme, with the BS, in connection with using equation (5) or equation (6). When the second scheme 2 of FIG. 11 is applied, the control unit 1510 can control the reception unit 1530, in order to confirm the CCE index(es) or ECCE index(es), so as to receive information regarding CCE index(es) or ECCE index(es), which are assigned to a search space for a PDCCH or EPDCCH candidate in the plurality of downlink subframes, from the BS via higher layer signaling.

The above description has been given only to describe the technical idea of the present invention in an exemplary manner, and various changes and modifications would be possible to a person skilled in the art, to which the present invention pertains, without escaping the essential characteristics of the present invention. Therefore, the embodiments disclosed in the present invention are not for the purpose of limiting the technical idea of the present invention, but for describing the same, and the scope of the technical idea of the present invention is not limited by such embodiments. The scope of the present invention is to be interpreted in view of the accompanying claims, and all technical ideas within any equivalent range are to be interpreted as being included in the scope of the present invention.

The invention claimed is:

1. A method for transmitting a downlink control channel by a base station, the method comprising:
   determining a starting subframe of a plurality of downlink subframes for repeatedly transmitting the downlink control channel;
   determining a search space comprising at least one of control channel element (CCE) indexes and enhanced CCE (ECCE) indexes, wherein the CCE indexes constitute a Physical Downlink Control Channel (PDCCH) candidate, the ECCE indexes constitute an Enhanced Physical Downlink Control Channel (EPDCCH) candidate, and the PDCCH candidate and the EPDCCH candidate are repeatedly transmitted via the plurality of downlink subframes; and
   transmitting the downlink control channel repeatedly via the plurality of downlink subframes based on the determined starting subframe and at least one of CCE indexes and ECCE indexes,
   wherein the determining a search space comprises determining at least one of CCE indexes and ECCE indexes in a first starting subframe in which the PDCCH candidate and the EPDCCH candidate are repeatedly transmitted and determining at least one of CCE indexes and ECCE indexes in a next starting subframe; and
   wherein the CCE indexes and the ECCE indexes in the next starting subframe are the same as the CCE indexes and the ECCE indexes in the first starting subframe.

2. The method as claimed in claim 1, wherein the determining a search space is performed using a number N of repeated transmission and an aggregation level L.

3. A method for receiving a downlink control channel by a user equipment (UE), the method comprising:
   confirming a starting subframe of a plurality of downlink subframes for repeatedly transmitting the downlink control channel;
   confirming at least one of CCE indexes and ECCE indexes assigned to a search space for a PDCCH candidate or an EPDCCH candidate in the plurality of downlink subframes; and
   performing monitoring via the plurality of downlink subframes and receiving the downlink control channel repeatedly based on the confirmed starting subframe and at least one of CCE indexes and ECCE indexes,
   wherein the confirming a starting subframe comprises confirming at least one of CCE indexes and ECCE indexes in a first starting subframe in which the PDCCH candidate and the EPDCCH candidate are repeatedly transmitted and confirming at least one of CCE indexes and ECCE indexes in a next starting subframe; and
   wherein the CCE indexes and the ECCE indexes in the next starting subframe are the same as the CCE indexes and the ECCE indexes in the first starting subframe.

4. The method as claimed in claim 3, wherein the confirming at least one of CCE indexes or ECCE indexes is performed using a number N of repeated transmission and an aggregation level L.

5. The method as claimed in claim 3, wherein, in the performing monitoring via the plurality of downlink subframes and receiving the downlink control channel repeatedly, the same PDCCH or EPDCCH candidate is monitored in a repetition window which is repeatedly received via the plurality of downlink subframes.

6. A base station for transmitting a downlink control channel, the base station comprising:
   at least one hardware processor that executes a control unit configured to determine a starting subframe of a plurality of downlink subframes for repeatedly transmitting the downlink control channel and determine a search space comprising at least one of CCE indexes and ECCE indexes, wherein the CCE indexes constitute a PDCCH candidate, the ECCE indexes constitute an EPDCCH candidate, and the PDCCH candidate and the EPDCCH candidate are repeatedly transmitted via the plurality of downlink subframes; and
   a transmitter configured to transmit the downlink control channel repeatedly via the plurality of downlink subframes based on the determined starting frame and at least one of CCE indexes and ECCE indexes,
   wherein the control unit is configured to control determining at least one of CCE indexes and ECCE indexes in a first starting subframe in which the PDCCH candidate and the EPDCCH candidate are repeatedly transmitted and determining at least one of CCE indexes and ECCE indexes in a next starting subframe; and
   wherein the CCE indexes and the ECCE indexes in the next starting subframe are the same as the CCE indexes and the ECCE indexes in the first starting subframe.

7. The base station as claimed in claim 6, wherein the control unit is configured to control determining a search space comprising the CCE indexes and ECCE indexes using a number N of repeated transmission and an aggregation level L.

8. A user equipment (UE) for receiving a downlink control channel, the UE comprising:
- at least one hardware processor that executes a control unit configured to confirm a starting subframe of a plurality of downlink subframes for repeatedly transmitting the downlink control channel and confirm at least one of CCE indexes and ECCE indexes assigned to a search space for a PDCCH candidate or an EPDCCH candidate in the plurality of downlink subframes; and
- a receiver configured to perform monitoring via the plurality of downlink subframes and receive the downlink control channel repeatedly based on the confirmed starting subframe and at least one of CCE indexes and ECCE indexes,
- wherein the control unit is configured to control confirming at least one of CCE indexes and ECCE indexes in a first starting subframe in which the PDCCH candidate and the EPDCCH candidate are repeatedly transmitted and confirming at least one of CCE indexes and ECCE indexes in a next starting subframe; and
- wherein the CCE indexes and the ECCE indexes in the next starting subframe are the same as the CCE indexes and the ECCE indexes in the first starting subframe.

9. The UE as claimed in claim 8, wherein the control unit is configured to control determining the CCE indexes or the ECCE indexes using a number N of repeated transmission and an aggregation level L.

* * * * *